US007114018B1

(12) United States Patent
Maity et al.

(10) Patent No.: US 7,114,018 B1
(45) Date of Patent: Sep. 26, 2006

(54) METHODS, SYSTEMS, AND COMPUTER PROGRAM PRODUCTS FOR COMMUNICATION OF NON-KEYBOARD RELATED DATA VIA A KEYBOARD CONNECTION

(75) Inventors: Sanjoy Maity, Snellville, GA (US); Joseprabu Inbaraj, Lawrenceville, GA (US); Baskar Parthiban, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 467 days.

(21) Appl. No.: 10/752,321

(22) Filed: Jan. 6, 2004

(51) Int. Cl.
*G06F 13/00* (2006.01)

(52) U.S. Cl. ............................. 710/72; 710/2; 710/11; 710/62; 345/163; 345/168; 709/217; 715/746; 715/754

(58) Field of Classification Search ................ 710/1–4, 710/8–12, 36–38, 62–67, 72–73; 345/156–170; 709/217–219; 715/746, 754
See application file for complete search history.

(56) References Cited

U.S. PATENT DOCUMENTS

| 4,964,075 A * | 10/1990 | Shaver et al. ................. 710/67 |
| 5,895,452 A * | 4/1999 | Lum ............................. 705/16 |
| 6,081,856 A * | 6/2000 | Comer ......................... 710/67 |
| 6,546,441 B1 * | 4/2003 | Lum ............................. 710/72 |
| 6,681,250 B1 * | 1/2004 | Thomas et al. ............. 709/226 |
| 6,792,452 B1 * | 9/2004 | Philyaw ....................... 709/217 |
| 6,901,455 B1 * | 5/2005 | Gough .......................... 710/8 |
| 6,963,935 B1 * | 11/2005 | Young et al. ................. 710/29 |
| 2003/0188049 A1 * | 10/2003 | Dickens ........................ 710/8 |
| 2004/0044913 A1 * | 3/2004 | Wu ............................. 713/202 |
| 2004/0113891 A1 * | 6/2004 | Lee ............................. 345/169 |
| 2005/0044184 A1 * | 2/2005 | Thomas et al. ............. 709/219 |
| 2005/0066000 A1 * | 3/2005 | Liaw et al. ................. 709/204 |

* cited by examiner

*Primary Examiner*—Christopher Shin
(74) *Attorney, Agent, or Firm*—Hope Baldauff Hartman, LLC (57) ABSTRACT

Communicating non-keyboard related data via a keyboard connection is disclosed. A keyboard protocol format is added to the non-keyboard related data. The non-keyboard related data is then transmitted within the keyboard protocol format through the keyboard connection. Once the keyboard protocol format has been received through the keyboard connection, it is parsed to retrieve the non-keyboard related data from the keyboard protocol format. The non-keyboard related data is then processed accordingly. The non-keyboard related data may include mouse coordinates, a command to disable a display of a mouse cursor, a test signal, or mouse function commands transmitted from a remote computer to a local computer over a network via an interaction device and through the keyboard connection of the local computer. The keyboard connection may be a PS/2 connection or an USB connection.

37 Claims, 4 Drawing Sheets

METHODS, SYSTEMS, AND COMPUTER PROGRAM PRODUCTS FOR COMMUNICATION OF NON-KEYBOARD RELATED DATA VIA A KEYBOARD CONNECTION

RELATED APPLICATIONS

The present application hereby incorporates by reference patent application Ser. No. 10/247,876 entitled Systems and Methods for Establishing Interaction Between a Local Computer and a Remote Computer, filed on Sep. 20, 2002.

TECHNICAL FIELD

The present invention relates to data communication routes. More particularly, the present invention relates to methods, systems, and computer program products for communicating non-keyboard related data via a keyboard connection on a computer.

BACKGROUND

The speed of data communication or transmission is a significant factor in assessing computer system performance and is a competitive advantage. Thus, computer manufacturers and programmers continuously work to make data communication as efficient and as accurate as possible. As an example, it is often necessary to manage activities of a local computer or determine the relative health of a local computer system by viewing data represented by screen display information of the local computer and/or interacting with the local computer by communicating data through user input devices. However, it is not always feasible for a technician or other user to be physically present at a local computer to manage the local computer's activities. Present solutions to this problem allow a user to view the screen information of and interact with the local computer, via remote user inputs from a remote mouse and/or keyboard anywhere a remote computer is located. However, due to the limited bandwidth and hence the screen frame rate, the data communication speed of screen display information being redirected from the local and remote computer becomes an issue when viewing mouse movements of the display information.

Depending on how the data is transmitted, screen frame displays redirected from the local computer may appear adequate at the remote computer display, while the redirected mouse movements or functions may appear delayed or sluggish at the remote computer due to delayed transmission. Mouse movements are executed faster than the local computer can accurately represent under screen frame redirection speeds. Previous systems would either turn off a mouse over window option at the remote computer display such that, although delayed and sluggish, only the mouse cursor or pointer redirected from the local computer display is shown at all times or simultaneously display both the remote mouse cursor and a mouse cursor of the screen frame from the local computer.

Previous systems also communicate mouse movements through the conventional mouse port of the local computer as a change or delta from a previous mouse position. This form of communication is sensitive to the mouse cursor acceleration settings of both the local and remote computers thereby also contributing to the sluggish display of mouse movements at the remote computer. The delayed or sluggish appearance causes the user of the remote mouse to over-compensate thereby missing screen targets and initiating multiple mouse function commands.

Further, a simultaneous display of the remote mouse cursor and a mouse cursor of the screen frame from the local computer on the remote screen also adds to delay and complexity for a user interacting with the two mouse cursors, one being a sluggish mouse cursor displayed from the local computer. Thus, costly increases in the time and expenses of managing computer activities may result from the sluggish mouse movements.

SUMMARY

Embodiments of the present invention address these problems and others by communicating non-keyboard related data through the keyboard connection of a local computer. The non-keyboard related data may include user inputs from a remote computer to the local computer such as the mouse coordinates of a remote mouse cursor. In one example, the non-keyboard related data may also include a command from the remote computer to disable or turn off a local mouse cursor display at the local computer while allowing the remote mouse cursor to remain visible on the remote display screen. Thus, mouse movements at the remote computer are immediately displayed at the remote display screen as the mouse coordinates of the remote mouse cursor are sent to the local computer. Because the invisible local mouse cursor at the local computer continuously updates its coordinates to those of the remote mouse cursor, the local and remote mouse cursors remain overlapped without being impacted by mouse cursor acceleration settings.

The screen frame data corresponding to the screen frames produced by the local computer is passed through a network, such as the Internet, to the remote computer where the remote computer produces a display that contains the screen frames being transferred. Because the display of the local mouse cursor is turned off, mouse movements of the local mouse cursor are not displayed on the screen frames of the local computer thereby avoiding subsequent cursor updates at the remote display screen. Thus, a user can view the screen information of the local computer anywhere a remote computer is located, without sluggish mouse movements and missing targets at the remote display One embodiment is method for communicating non-keyboard related data via a keyboard connection. The method involves receiving the non-keyboard related data at an interaction device. A keyboard protocol format is added to the non-keyboard related data at the interaction device. The non-keyboard related data is then transmitted within the keyboard protocol format through the keyboard connection of the local computer. The local computer receives and parses the keyboard protocol format to retrieve the non-keyboard related data from the keyboard protocol format and then processes the non-keyboard related data. For example the local computer may process the mouse coordinates of a remote mouse cursor as the mouse coordinates of a local mouse cursor at the local computer.

Another embodiment is a method for communicating non-keyboard related data to server computers in a server farm via the keyboard connections of the server computers. The method involves receiving the non-keyboard related data at an interaction device for establishing interaction between a remote computer and the server farm computers. The interaction device adds a keyboard protocol format to the non-keyboard related data and selects a server computer to receive the non-keyboard related data. The interaction device selects the server computer at a KVM switch that interconnects the interaction device with the server farm. The interaction device then transmits the non-keyboard related data within the keyboard protocol format through the KVM switch and to the keyboard connection of the selected server computer in the server farm. The server computer receives and parses the keyboard protocol format to retrieve the non-keyboard related data from the keyboard protocol format and then processes the non-keyboard related data. For example, processing the non-keyboard related data may include disabling a display of the local mouse cursor where the non-keyboard related data may be a non-standard keyboard sequence representing a command to disable the mouse cursor display of a local computer. This command helps prevent sluggish mouse movements by allowing only the remote mouse cursor to be visible on the display screen of a remote computer that displays activity at the local computer.

Still another embodiment of the present invention may be a method for communicating mouse coordinates of a remote mouse cursor via a keyboard connection of a local computer where the remote mouse cursor is displayed over a remote display of a remote computer. The method involves disabling a display of a local mouse cursor to result in an invisible mouse cursor operative over screen frames of a local display of the local computer. The method also involves allowing the remote mouse cursor to be visible at the remote display over the screen frames of the local display that are redirected to the remote display. Mouse coordinates of the remote mouse cursor are retrieved at the remote computer. The mouse coordinates are then sent to and received at the local computer via the keyboard connection of the local computer. A position of the invisible cursor is then set to the mouse coordinates received at the local computer. Next the screen frames of the local display of the local computer are captured and redirected over a network to the remote display where remote display is formed wholly or in part by the screen frames of the local display that are redirected over the network.

An embodiment of the present invention may be a computer program product including a computer readable medium storing control logic for directing an interaction device to communicate non-keyboard related data via a keyboard connection. The control logic includes computer readable program code that directs the interaction device to receive the non-keyboard related data, add a keyboard protocol format to the non-keyboard related data, and transmit the non-keyboard related data within the keyboard protocol format through the keyboard connection of a local computer. The computer program product also includes computer readable code that directs the local computer to receive and parse the keyboard protocol format to retrieve the non-keyboard related data from the keyboard protocol format. Further, the computer program product includes computer readable code means that directs the local computer to process the non-keyboard related data.

Another embodiment of the present invention may be a system for communicating non-keyboard related data via a keyboard connection. The system includes an interaction device operative to interface with input devices and output devices and receive the non-keyboard related data. The interaction device is also operative to execute a keyboard protocol application to add a keyboard protocol format to the non-keyboard related data and transmit the non-keyboard related data within the keyboard protocol format through the keyboard connection.

The system may further include one or more local computers in communication with a keyboard connection capable of receiving the non-keyboard related data within the keyboard protocol format. The local computers may be operative to execute an operating system and a keyboard filter driver to receive and parse the keyboard protocol format to retrieve the non-keyboard related data from the keyboard protocol format. The local computers may also be operative to execute a playback agent to process the non-keyboard related data.

DETAILED DESCRIPTION

Non-keyboard related data is communicated through a keyboard connection in embodiments of the present invention. For example, an end user of a remote computer may operate a user input device of the remote computer such as a remote mouse, and the user input is communicated through a keyboard connection to a local computer where it may be displayed as a local mouse cursor and implemented. (Mouse cursors may also be referred to as mouse pointers). However, a display of a remote mouse cursor of the remote computer is kept visible at the remote computer's display screen while the display of a mouse cursor at the local computer may be disabled. The disabled local mouse cursor display at the local computer produces an invisible local mouse cursor that is still operative to execute the placement and functions of the remote mouse at the local computer, but is not included in the display of the local computer. The display of the local computer is then redirected to the remote computer display via an interaction device.

Because the remote mouse cursor remains visible at the remote computer, mouse movements are immediately executed on the remote display screen without waiting for a redirected display of the local mouse cursor. Additionally, when the local mouse cursor display is disabled and made invisible at the local computer, one mouse cursor is displayed at the remote display instead of two mouse cursors. This is less confusing to users who previously dealt with updates from a local mouse cursor redirected to the remote display through bandwidth constraints and slow transmission. Furthermore, because the mouse inputs, such as coordinates and mouse clicks, are communicated via the keyboard connection or port of the local computer, communication speed is unhindered by differences in mouse acceleration settings between the local and remote computers. Thus, the end user can remotely view and interact with screen frames being produced by the local computer to determine the status of the local computer and to control the local computer without having to endure sluggish mouse movements and mis-targeted mouse inputs on the local computer's redirected display.

Figure 1:
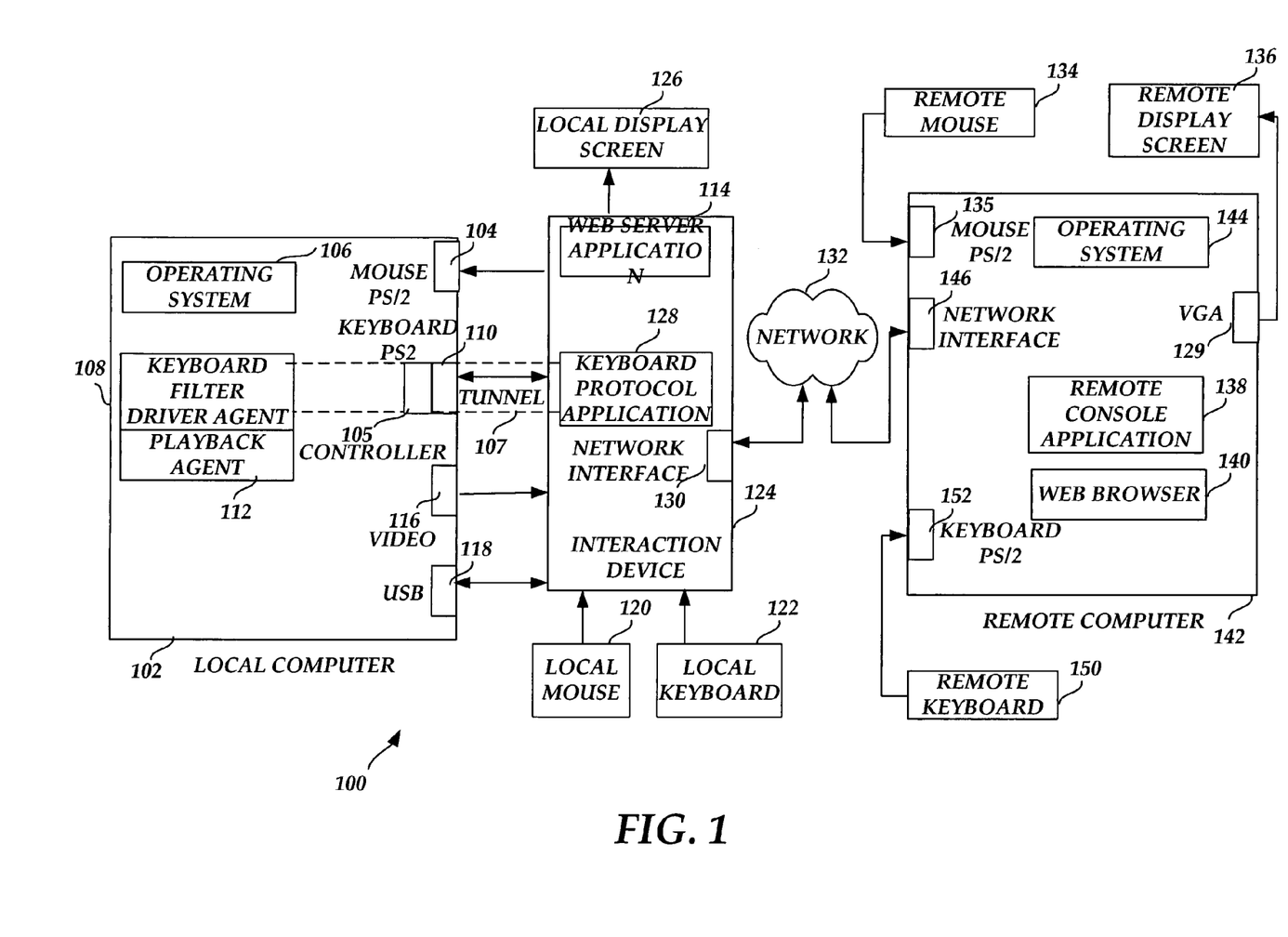
FIG. 1 illustrates a network operating environment for embodiments of the present invention that allow a remote computer to communicate non-keyboard related data via a keyboard connection.

An environment 100 for application of embodiments of the present invention is shown in FIG. 1. The environment generally includes a local computer 102 that is to be remotely managed. The local computer 102 may be a client, host, and/or server computer. An interaction device 124 is disposed between a network 132 and the local computer 102. A remote computer 142 is linked to the network 132, and the local computer 102 may or may not be linked to the same network 132 or another network not shown. The network 132 may be of various forms such as a local area network ("LAN") or wide area network ("WAN") including the Internet. A user is located at the remote computer 142 and remotely manages the local computer 102 via the network 132 and interaction device 124.

The interaction device 124 may be linked to the local computer 102 through several input/output ("I/O") connections of the local computer 102. Generally, a local computer 102 will have a video display output 116, such as an analog or digital VGA output. Also, the local computer 102 typically includes a PS/2 port or ordinary serial port configured as a mouse port 104, a keyboard port PS/2 110, a keyboard controller 105 for translation of keyboard make and break codes, and may also or alternatively include a universal serial bus ("USB") port 118.

The video display output 116 of the local computer 102 provides a signal that ordinarily is passed directly to a display screen or monitor 126 where screen frames are displayed for a user present at the local computer 102. However, in the embodiment shown, the video display output 116 provides a video signal to a video input of the interaction device 124. The interaction device 124 then passes the video signal through a video output to the display screen 126 where a normal video display of screen frames occurs. The details of the interaction device 124 and its operations upon the video signal are provided in patent application Ser. No. 10/247,876 entitled Systems and Methods for Establishing Interaction Between a Local Computer and a Remote Computer, filed on Sep. 20, 2002 which is herein incorporated by reference.

User input devices may also be provided for the local computer 102, including a local mouse 120 and local keyboard 122. Conventionally, the local mouse 120 and local keyboard 122 would be directly connected to the mouse port 104 and keyboard port 110 of the local computer 102. However, for the embodiment shown, the local mouse 120 and local keyboard 122 are connected to a mouse port and keyboard port, respectively, of the interaction device 124 and provide mouse and keyboard data to the interaction device 124 through these connections. The interaction device 124 then passes the mouse data and keyboard data to the respective ports of the local computer 102.

In addition to providing the pass-through of the video signal to the display screen 126, the interaction device 124 captures screen frame data from the video signal and transfers the screen frame data across the network 132 to the remote computer 142. The interaction device 124 implements a web server application 114 that provides an IP address whereby remote computers may access data from the interaction device 124. The interaction device 124 also implements a keyboard protocol application 128 for adding a non-standard keyboard protocol format to non-keyboard related data. The remote computer 142 has a network interface 146 linking the remote computer 142 to the network 132. The network interface 146 used by the remote computer 142 may be of various forms such as a dial-up modem or an Ethernet connection to a LAN. Various protocols of data transfer may be utilized between the interaction device 124 and the remote computer 142, such as the TCP/IP protocol ordinarily used via the Internet.

The remote computer 142 implements an application, such as a dedicated application or general purpose browser window such as a web browser 140, for receiving the screen frame data through the network interface 146 and providing a display on the display screen 136. The web browser 140 may be INTERNET EXPLORER from MICROSOFT CORPORATION of Redmond, Wash. The display includes the screen frame produced by the local computer 102 that corresponds to the screen frame data transferred by the interaction device 124. Typically, the remote computer 142 includes a video adapter that has a video output 129 connected to the display screen 136 to provide the video signals.

To allow the user of the remote computer 142 to fully interact with the local computer 102, user interface devices such as a mouse 134 and keyboard 150 are connected to a mouse port 135 and keyboard port 152, respectively, of the remote computer 142. The user manipulates the mouse 134 and keyboard 150 to interact with the screen frame shown on the remote display screen 136, which may be formed wholly or in part by the screen frame data received over the network 132. When the user activity at the remote computer 142 is entered with respect to the screen frame data received from the interaction device, then the processing device of the remote computer 142 transfers the user activity data over the network 132 to the interaction device 124. The remote computer 142 transfers user input activity to the interaction device 124 via a remote console application 138. For example the remote console application 138 may retrieve the mouse coordinates of the remote mouse cursor from the operating system 144 and send the mouse coordinates to the network interface 146 for transmission to the interaction device 124. It should be appreciated that mouse coordinate information may be given as an offset if the coordinates are displayed in a window or in a different graphics resolution from the local computer. The interaction device 124 then adds a keyboard protocol format to the non-keyboard related data, mouse coordinates, with the keyboard protocol application 128. The interaction device 124 then passes the data of the keyboard protocol format through the keyboard port 110 to the keyboard filter driver agent 108 of the local computer 102 thus creating a keyboard tunnel 107 for data communication.

Once the local computer 102 receives the non-keyboard related data through the keyboard port 110, the keyboard filter driver agent 108 of the local computer 102 then works in conjunction with the operating system 106 to identify and retrieve the non-keyboard related data from the keyboard protocol format by interpreting and consuming the keyboard protocol format. The local computer 102 then implements the non-keyboard related data representing the remote user input activity via a playback agent 112 as if the user activity had occurred through the local computer 102. When implemented, the user activity may or may not alter the screen frame to be displayed. Therefore, the video signal output by the video connector 116 to the interaction device 124 provides the screen frames that show the change caused by the user activity at the remote computer 142, such as the resulting display of mouse clicking a menu selection. However, when the local mouse cursor display is disabled so that it is invisible, the mouse cursor moving within the display would not be a visible part of the video signal output by the video connector 116 and thus not visible at the display screen 126. Therefore, the mouse cursor viewed at the remote display screen 136 is only the mouse cursor of the remote computer.

The keyboard filter driver agent 108, the playback agent 112, the keyboard protocol application 128, and the remote console application 138 may also be referred to as computer readable media. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

The interaction device 124 transfers the screen frame data showing the user activity enabled for display to the remote computer 142 where it is then provided to the display screen 136. Thus, the user activity enabled for display on the local computer display 126 and initially performed at the remote computer 142, such as a resulting display from mouse clicks, is represented on the display screen 136 after updating the video display of the local computer 102 and transferring the updated screen frame back to the remote computer 142. In contrast, the user activity disabled for display on the local computer display 126 and initially performed at the remote computer 142, such as remote mouse cursor movements, is represented by remote mouse cursor movement on the display screen 136 immediately as it is being performed by the user. Thus, only a single mouse cursor is shown at all times, regardless of propagation delays.

In addition to receiving user input, the interaction device 124 may also provide for additional interaction with the remote computer 142 by providing a USB connection to a USB port 109 of the local computer 102. The USB connection allows the interaction device 124 to emulate USB devices for the local computer 102, such as additional storage devices including devices that the local computer 102 may use when booting-up. For example, the remote computer 142 may provide a floppy, CD-ROM, or hard disk drive that contains a boot-up sequence to be used by the local computer 102. Upon a connection being established over the network 132 between the interaction device 124 and remote computer 142, the local computer 102 may boot from a media source of the remote computer 120 with the boot-up sequence provided through the USB port 109.

The USB connection from the interaction device 124 may also allow a local keyboard and mouse and/or a keyboard and mouse of the remote computer to be emulated for the local computer 102. For example, the local computer 102 may have only USB ports instead of PS/2 ports and the interaction device 124 may output mouse and keyboard signals to the local computer through the USB connection 118.

Figure 2:
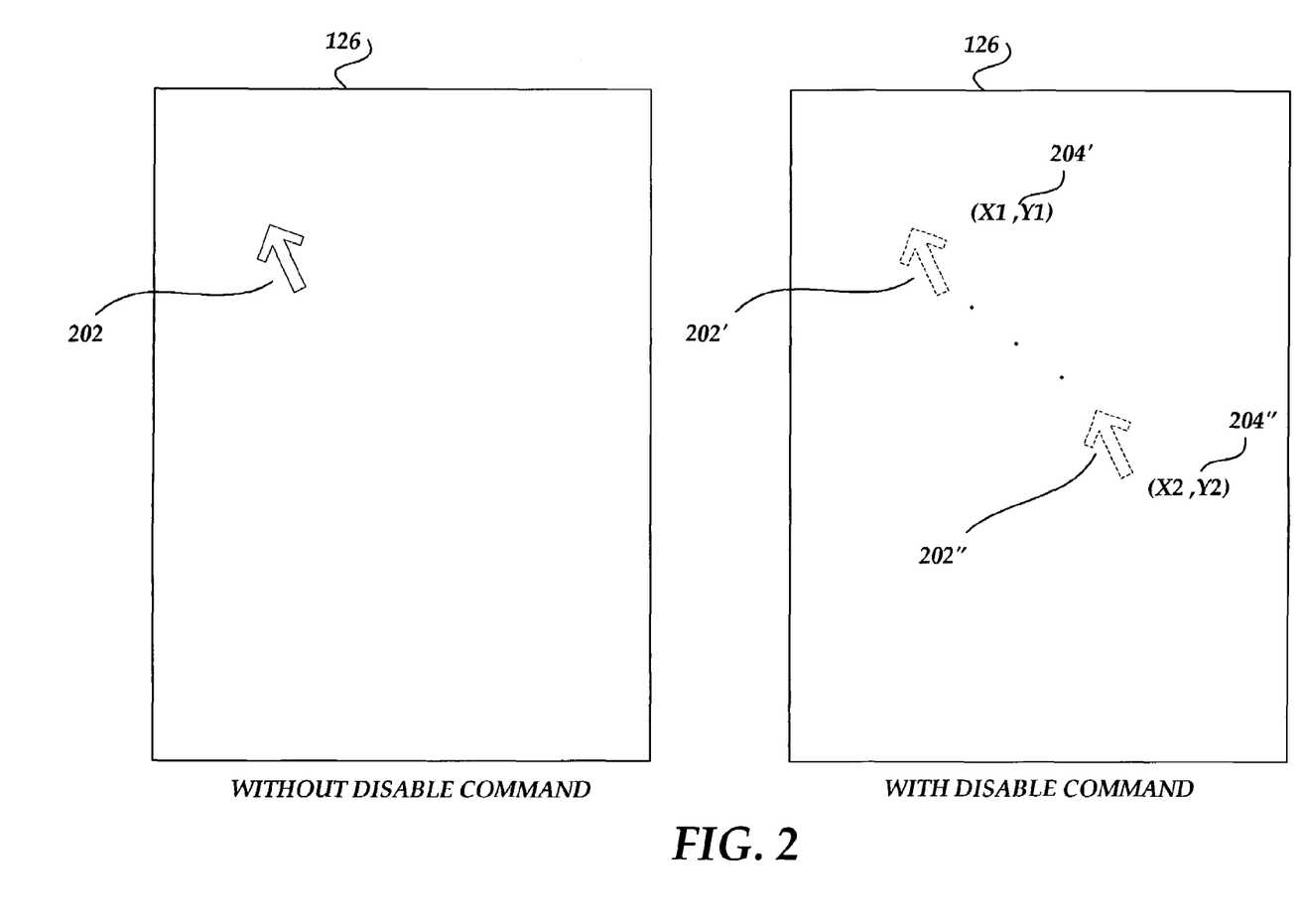
FIG. 2 illustrates the display screen of a local computer without and with having a display of the mouse cursor disabled at the local computer.

FIG. 2 illustrates the display screen 126 of the local computer of FIG. 1 with and without disabling the mouse cursor display at the local computer. In this embodiment, the non-keyboard related data may include a disable command from the remote computer 142 to disable the display of the local mouse cursor 202, representing the location of the remote mouse cursor on the display device 126. The disable command may be sent to the local computer 102 upon initiating redirection mode at the remote computer 142. Disabling the local mouse cursor display will result in an invisible mouse cursor at the local display screen 126, reduce delays due to propagation of a visible local mouse cursor, and reduce confusion produced from having two mouse cursors displayed on the remote computer display screen 136. Without receiving the disable command, the display device 126 displays the local mouse cursor 202 that duplicates the position of the remote mouse cursor over the redirected screen frames of the local display 126 during redirection mode. When the command to disable the display of the local mouse cursor 202 is received, the mouse cursor is still operative but is no longer visible on the display as indicated by the dashed lines of the mouse cursor 202'/202" of FIG. 2.

The non-keyboard related commands, such as the disable command and mouse function commands (mouse button clicks), and the keyboard protocol format are generated as non-standard keyboard sequences. Non-standard keyboard sequences include non-standard keys or key combinations represented by keyboard make codes and break codes. Those skilled in the art will understand that make codes are generated on the press of a key and break codes are generated on the release of a keyboard key. For example, non-keyboard related commands and the keyboard protocol format may each be represented by a non-standard sequence of consecutive make codes which represents a keyboard key combination generating make codes and break codes. This key combination may be chosen as one that would be too complex, involving to many keystrokes to have been initiated by a human.

Referring again to FIG. 1, as standard and non-standard keyboard sequences are sent to the local computer 102 through the keyboard connection 110, the controller 105 translates the make and break codes into scan codes. The scan codes are sent to a keyboard buffer (not shown) to await retrieval by the operating system 106. However, the keyboard filter agent scans the buffer to find tags that indicate the initiation of a keyboard tunnel 107 for receiving non-keyboard related data. If the keyboard tunnel 107 has not been established yet by a start tag then, the buffer contents are provided to the operating system 106 as normal. Non-standard keyboard sequences are provided from the interaction device 124 to allow the keyboard filter driver agent 108 to distinguish between standard keyboard communication when no tunnel is established and non-standard tag or coordinates keyboard communication. The start tags turn on the keyboard tunnel 107 and the mouse coordinates pass through the tunnel 107 to the keyboard filter driver agent 108.

The keyboard filter driver agent 108 passes standard keyboard communication directly to the operating system 106 for execution. In contrast, when the keyboard filter driver agent 108 receives a non-standard scan code, it recognizes that the following communication is not keyboard related and requires different processing. For example, the disable command is generated at the remote computer 142 by the remote console application 138 as a non-standard keyboard sequence. The disable command is then sent to the interaction device 124 where a keyboard protocol format is added to the command. Adding the keyboard protocol format includes adding other non-standard keyboard sequences to the disable command representing a start tag and an end tag in the following sequence:

<start tag><disable command><end tag>.

The above sequence is presented in the form of non-standard sequence of make codes and break codes. The sequence is sent to the keyboard controller 105 where it is translated into scan code format. When the keyboard filter driver agent 108 receives and recognizes the start tag, the keyboard filter driver agent 108 consumes the start tag and interprets the next scan codes as the disable command by providing the disable command to the playback agent 112. The keyboard filter driver agent 108 then consumes the end tag thereby recognizing the end of the keyboard tunnel transmission. The playback agent 112 then disables the display of the local mouse cursor to result in an invisible mouse cursor 202.

Referring again to FIG. 2, the non-keyboard related data may also include mouse coordinates 204 of the remote mouse cursor as the user moves the remote mouse 134 in reference to the redirected screen frames of the local display screen 126 at the remote computer 142. Before initially communicating the non-keyboard related data, the mouse cursor 202, simulating the position of the remote mouse cursor, is not present on the display device 126. However, after initiating redirection, the coordinates of the remote mouse cursor are communicated via the keyboard tunnel 107, via <start tag><coordinate X, coordinate Y,><end tag>, as movement of the remote mouse cursor is displayed immediately at the remote display screen 136 upon the user moving the remote mouse 134. Mouse cursor movement is illustrated in FIG. 2 by the invisible mouse cursor 202'/202" overlapping the remote mouse cursor movements. The mouse coordinates (X1, Y1) and (X2, Y2) are represented by non-keyboard related data periodically communicated from the remote computer 142 and through the keyboard tunnel 107 via the start tags and end tags for overlapping mouse cursor movements between the remote and local computers.

More particularly, in one embodiment the keyboard protocol application 128 of the interaction device 124 forms the mouse coordinate keyboard protocol format as follows:

<start tag> (make codes of a keyboard key combination)
    <mouse-coordinate-cmd>
    <end tag> (make codes of a keyboard key combination)

Mouse coordinate command is formatted as follows:

<one make code for cmd-identifier>
    <one make code for mouse-button-status>
    <four make codes of numbers to give X coordinate>
    <four make codes of numbers to give Y coordinate>

In the case of the mouse coordinates 204' (X1, Y1), after translating the keyboard protocol format containing the mouse coordinates into scan codes at the controller 105, the keyboard protocol format may be illustrated as follows:

<start tag> <X1> <Y1> <end tag> where X1 and Y1 may each be represented as four scan codes as follows:

X1=<scan code 1, scan code 2, scan code 3, scan code 4>
    Y1=<scan code 5, scan code 6, scan code 7, scan code 8>.

Figure 3:
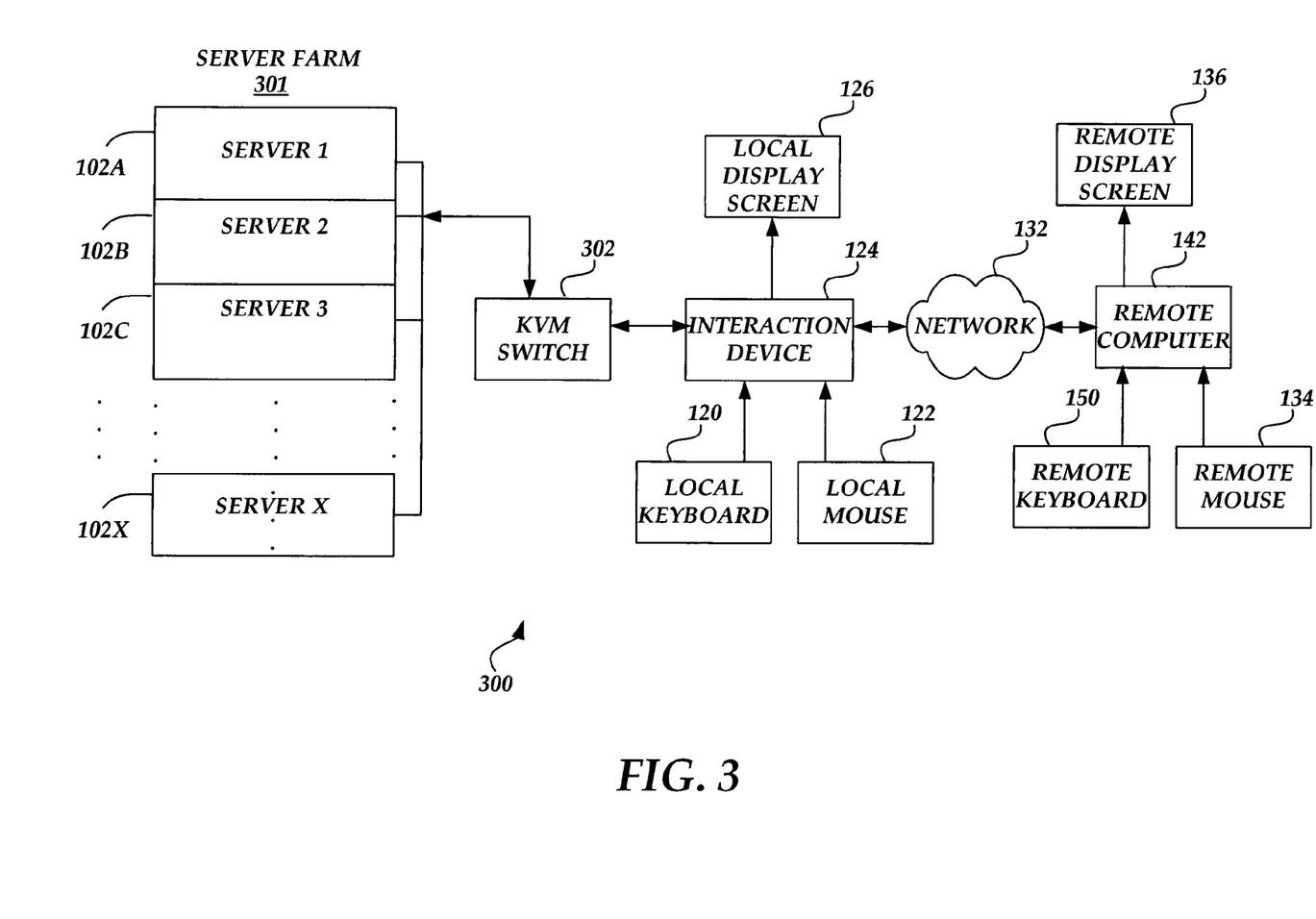
FIG. 3 illustrates a network operating environment for embodiments of the present invention that allow a remote computer to communicate non-keyboard related data via keyboard connections to multiple server computers in a server farm.

As briefly described above, when the keyboard filter driver agent 108 recognizes the start tag, the keyboard filter driver agent 108 consumes the start tag and interprets the next four scan codes as the mouse coordinates for X1 and the subsequent four scan codes as the mouse coordinates for Y1. The end tag is then consumed indicating the end of the tunnel transmission. The keyboard filter driver agent 108 passes the coordinates to the playback agent 112 for processing. As the mouse coordinates of the remote mouse cursor change from (X1, Y1) to (X2, Y2), the coordinates (X2,Y2) are similarly communicated through the keyboard tunnel 107. The playback agent 112 then sets the position of the invisible mouse cursor 202" at the coordinates (X2 Y2). It should be appreciated that the mouse coordinates of the remote mouse cursor are retrieved from the operating system 144 and sent from the remote computer 142 as is, without being generated as a non-standard keyboard sequence. The coordinates are scaled by the remote application, since it knows the resolution of both local and remote displays. It should also be appreciated that the mouse coordinates may need to be converted to comply with a graphics resolution of the local display 126. FIG. 3 illustrates a network operating environment 300 for embodiments of the present invention that allow a remote computer 142 to communicate non-keyboard related data via keyboard connections to multiple server computers 102 in a server farm 301. This embodiment of the operating environment 300 includes multiple server computers 102A–102X in a server farm 301, each including the components described in the local computer 102. Here the keyboard tunnel 107 passes through a keyboard-video-mouse (KVM) switch 302 to the keyboard filter driver agent 108 on the currently selected server computer 102A–X through the keyboard connection 110. Because the KVM switch 302 communicates to multiple computers 102 the keyboard connection or port 110 is likely to be a PS/2 connection.

The KVM signals from all the server computers 102 go to the KVM switch 302 then KVM signals from one selected server computer 102 continues from the KVM switch 302 to the interaction device 124. Which server computer's KVM signals are sent to the interaction device 124 may be determined by a manual setting at the KVM switch 302 or an electronic instruction from the interaction device 124. In this embodiment, a remote computer 142 may communicate via the keyboard tunnel 107 with each server computer 102 by a selection of each server at the KVM switch 302.

The non-keyboard related data may also include a periodic test signal sent from the interaction device 124 through the keyboard tunnel 107, via start and end tags, to each server computer 102A–102X as it is selected to test whether a selected server computer has crashed or stalled. The keyboard filter driver agent 108 on the selected server computer will receive the test signal and produce a response signal in keyboard protocol format and transmit the signal through the keyboard tunnel 107 to the interaction device 124. The response signal is generated when the operating condition of the selected server computer is healthy. However, a response signal is not generated when the server computer is stalled or crashed, thereby giving notice to the interaction device 124 of a problem.

In the alternative to that shown in FIG. 3, each server computer 102 may be equipped with an interaction device 124, as shown in FIG. 1 for an individual server. In this case, the remote computer 142 may change communication from one server computer 102 to another by using the IP address of the particular interaction device 124 that is connected to the server computer 102 of interest.

Figure 4:
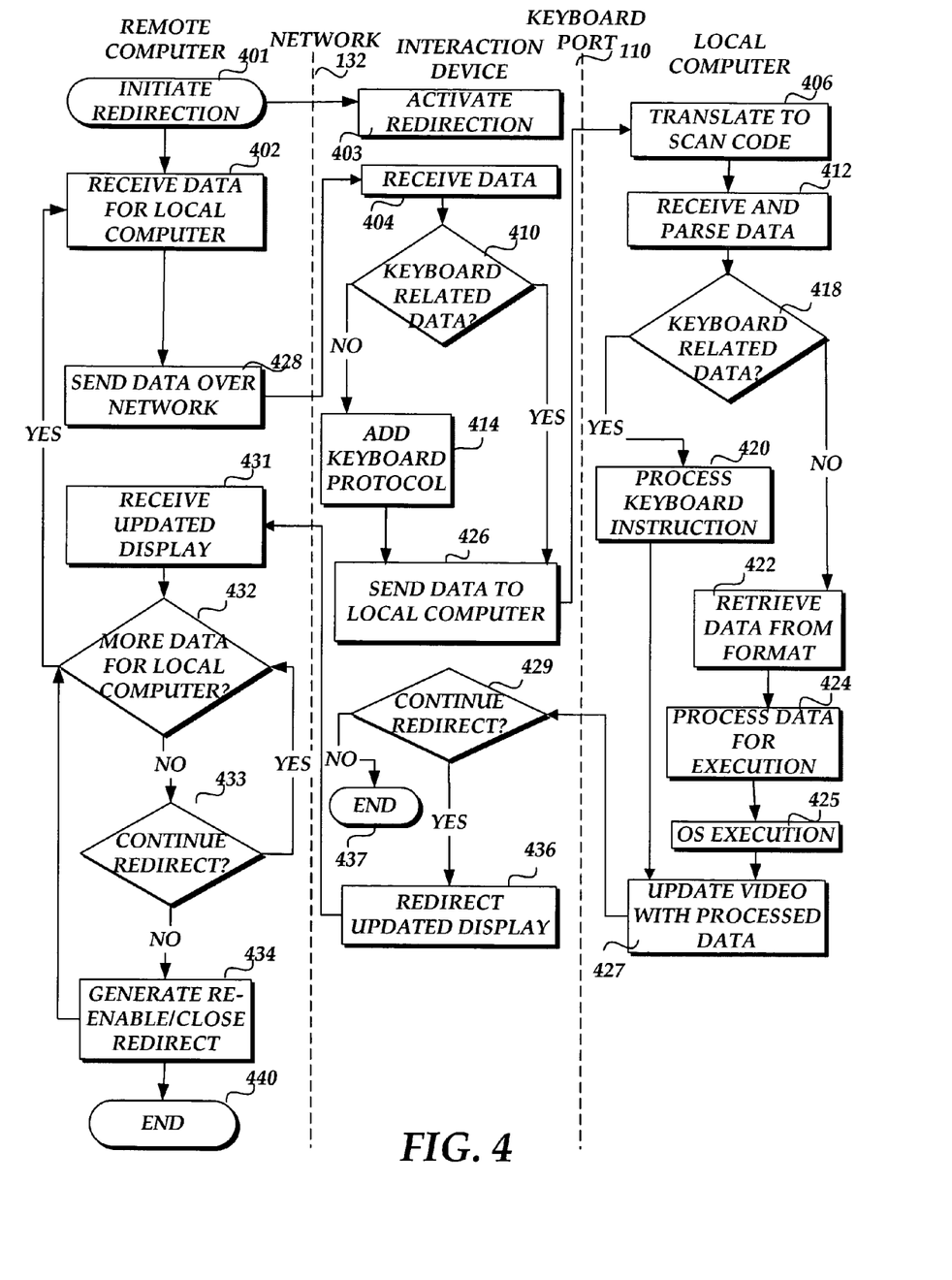
FIG. 4 shows the logical operations of the embodiment of FIG. 1 for communicating non-keyboard related data from the remote computer via a keyboard connection to the local computer for implementation at the local computer.

FIG. 4 shows the logical operations of the embodiment of FIG. 1 for allowing user input activity occurring at the remote computer to be communicated to the local computer via a keyboard connection 110. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The logical operations of FIG. 4 begin at the remote computer 142 where initiate operation 401 initiates redirection of screen frames from the display of the local computer screen 126 via the interaction device 124 at activate operation 403. Operation 401 may include receiving a user input redirection command acknowledging a request to view the local computer display screen 126 via the remote display 136.

Next, at receive operation 402, data is received from the operating system 144 by the remote console application 138 for communication to the local computer 102. The data received may include standard keyboard inputs and command data for the local computer 102, such as a disable display command for a local mouse cursor and mouse click and scroll commands. The received data also includes mouse coordinates of the remote mouse cursor so that the local computer may emulate remote mouse cursor movement at the local computer 102 during redirection mode. As described above with respect to FIGS. 1 and 2, in response to initiating redirection at operation 401, a disable display command is generated to disable the display of the local mouse cursor 202 at the local display screen 126 to result in an invisible mouse cursor 202.

Then at send operation 428, data such as the disable display command are transmitted to the interaction device 124 over the network 132. The interaction device receives the disable display command at receive operation 404. The interaction device 124 then enters redirection mode and at detection operation 410, the interaction device determines whether the data sent at operation 428 is keyboard related. If the data is keyboard related it is sent directly to the local computer 102 at send operation 426 described below Communication protocol between the remote computer and the interaction device is in the form of commands. There are different commands for different types of data. If the data is non-keyboard related, such as the disable display command, at add operation 414 the keyboard protocol application 428 adds a keyboard protocol format to the disable display command. The keyboard protocol format is added in the form of start tags and end tags of non-standard keyboard sequences generated from a table or a formula at the keyboard protocol application 128. After adding the keyboard protocol format, the data within the keyboard protocol format is sent to the local computer 102 at send operation 426.

The data from send operation 426 enters the local computer 102 at the keyboard connection 110. The keyboard controller 105 then translates the data to scan code format at translate operation 406. Scan code format is readable by the operating system 106 and the keyboard filter driver agent 108. Next, the filter operation 412 receives and parses the data at the keyboard filter driver agent 108. The keyboard filter driver agent 108 then detects whether the received data is standard keyboard related data at detection operation 418. This is accomplished by determining whether a non-standard keyboard key or key combination sequence is present as a start tag described above with respect to FIG. 2. Non-standard keyboard sequences are not used for normal keyboard operation. For example, a non-standard command may include a combination of the Alt key and eight other keyboard keys pressed simultaneously. This would be non-standard for normal keyboard use. Thus the keyboard filter driver agent 138 may recognize when non-keyboard related data has arrived. If the data is a standard keyboard related data, process operation 420 processes the data as a standard keyboard instruction by providing the data to the operating system for normal keyboard consumption. At update operation 427 the video screen frame of the display screen 126 is updated as the result of the operating system implementing the keyboard data.

When at detection operation 418, the data is non-keyboard related, retrieval operation 422 retrieves the non-keyboard related from within the keyboard protocol format. In order to retrieve the non-keyboard related data, the keyboard filter driver agent 108 consumes the start tag, interprets the non-keyboard related data, and consumes the end tag indicating the end of the keyboard tunnel transmission. For instance, when the non-keyboard related data is the disable display command, the keyboard filter driver agent 108 interprets the data as a command and provides process operation 424 with the command for processing.

At process operation 424, the playback agent 112 communicates the data to the operating system 106 for execution at execute operation 425. For instance, operating system 106 will execute the command to disable the display of the local mouse cursor at execute operation 425. The operating system 106 may distinguish the command from a look up table stored on the local computer. Next, update operation 427 updates the screen frame of the display screen 126 by sending the processed data through the video port 116 to the interaction device 124.

Next, a determination is made as to whether redirection mode is still active at detection operation 429. When redirection has been closed the operation ends at end operation 437. When redirection remains active, redirect operation 436 then sends the updated screen frames over the network 132 to the remote display screen 136. Where receive operation 431 receives and displays the updated screen frames on the remote display screen 136 in sync with the remote mouse cursor also displayed on the remote display screen 136.

Detection operation 432 determines whether there is more data that is to be communicated to the local computer 102 such as new mouse coordinates or mouse function commands. When data is available for the local computer, the data is received at the remote console application 138 from the operating system 144 at receive operation 402 described above. When at detection operation 432, there is no more data for transmission to the local computer 102, a determination is made at detect operation 433 as to whether redirection is set to continue. If redirection is set to continue, control returns to detection operation 432 described above. When redirection is not set to continue, close operation 434 generates a re-enable display command for the local mouse cursor and closes the redirection operation by terminating at end operation 440 after sending the re-enable command to receive operation 402.

Receive operation 402 receives the re-enable display command, then send operation 428 sends the re-enable command to the interaction device for processing in the operations described above until being executed at execute operation 425 described above. The video screen frame is updated at update operation 427 and at detection operation 429 a determination not to continue redirection is made. The operation 429 then terminates at end operation 437.

As one example of implementation of the logical operations, the invisible local mouse cursor receives updates from the remote computer 142 in the form of mouse coordinates as movement of the remote mouse cursor occurs over the redirected display of the local computer. Mouse coordinates are received from the operating system 144. It should be appreciated that because the mouse coordinates are not a command, thus they are not converted at convert operation 408 into a non-standard keyboard sequence but are sent in coordinate form at send operation 428 described above. The mouse coordinates continue through the operations described above until being processed at process operation 424 by being communicated to the operating system 106 and set as the mouse coordinates of the local mouse cursor at execute operation 425. The local mouse cursor is represented as an invisible cursor due to the preceding disable display command. The screen frame of the local display is then updated with mouse coordinates at update operation 427 and the display image is redirected to the remote computer screen display 136 to stay in sync with the remote mouse cursor which is displayed over the local computer image.

It should be appreciated that the non-keyboard related data may also include the mouse function commands, such as right button down, right button up, left button down, left button up, scroll button forward, scroll button backward, scroll button up, and scroll button down.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for communicating non-keyboard related data via a keyboard connection comprising:
   receiving the non-keyboard related data;
   adding a keyboard protocol format to the non-keyboard related data; and
   transmitting the non-keyboard related data within the keyboard protocol format through the keyboard connection;
   receiving and parsing the keyboard protocol format via the keyboard connection to retrieve the non-keyboard related data from the keyboard protocol format; and
   processing the non-keyboard related data.

2. The method of claim 1, wherein the non-keyboard related data comprises at least one of mouse coordinates of a remote mouse cursor and a mouse function command generated from a remote mouse connected to a remote computer and wherein the mouse function command comprises a non-standard keyboard sequence representing at least one of the following:
   right button down;
   right button up;
   left button down;
   left button up;
   scroll button forward;
   scroll button backward;
   scroll button up; and
   scroll button down;
   and wherein processing the non-keyboard related data comprises executing the mouse function command on a local computer having the keyboard connection.

3. The method of claim 1, wherein the non-keyboard related data comprises a command to disable a display of a mouse cursor to result in an invisible mouse cursor operative over a local display of a local computer having the keyboard connection wherein the command to disable comprises a non-standard keyboard sequence.

4. The method of claim 1, wherein the keyboard protocol format comprises a non-standard series of at least one of keyboard make codes and keyboard break codes and wherein prior to receiving and parsing the keyboard protocol format, the method further comprises translating the keyboard protocol format into a scan code readable structure.

5. The method of claim 1, wherein the non-keyboard related data comprises a test command periodically generated and transmitted through the keyboard connection to a local computer and wherein processing the test command comprises in response to receiving the test command, generating a keyboard command, the method further comprising:
   transmitting the keyboard command through the keyboard connection to indicate that the local computer is operative; and
   receiving the keyboard command at an interaction device as confirmation that the local computer is operative.

6. The method of claim 1, further comprising:
   receiving standard keyboard related data; and
   processing the standard keyboard related data to execute standard keyboard commands.

7. The method of claim 1, wherein the keyboard connection comprises one of a PS/2 connection and an USB connection.

8. The method of claim 2, wherein receiving the non-keyboard related data comprises receiving the mouse coordinates at an interaction device via a network and wherein adding a keyboard protocol format to the non-keyboard related data comprises:
   at the interaction device, adding a start tag to the beginning of the mouse coordinates wherein the start tag comprises a non-standard keyboard sequence indicating a start of the non-keyboard related data.

9. The method of claim 8, wherein adding a keyboard protocol format to the non-keyboard related data further comprises adding an end tag to the end of the mouse coordinates wherein the end tag comprises a non-standard keyboard sequence indicating an end of the non-keyboard related data.

10. The method of claim 8, wherein transmitting the non-keyboard related data within the keyboard protocol format through the keyboard connection comprises sequentially transmitting the start tag and the mouse coordinates through the keyboard connection as the keyboard protocol format.

11. The method of claim 9, wherein transmitting the non-keyboard related data within the keyboard protocol format through the keyboard connection comprises sequentially transmitting the start tag, the mouse coordinates, and the end tag through the keyboard connection as the keyboard protocol format.

12. The method of claim 9, wherein receiving and parsing the keyboard protocol format to retrieve the non-keyboard related data from the keyboard protocol format comprises:
   at a keyboard filter driver of the local computer having the keyboard connection:
      receiving and consuming the start tag as the non-standard keyboard sequence indicating the start of the non-keyboard related data;
      receiving and interpreting the non-keyboard related data as the mouse coordinates;
      receiving and consuming the end tag as the non-standard keyboard sequence indicating the end of the non-keyboard related data; and
      providing the mouse coordinates to a playback agent application.

13. The method of claim 12, wherein processing the non-keyboard related data comprises executing the playback agent application to utilize the mouse coordinates as the mouse coordinates of a local mouse cursor operative on a local computer having the keyboard connection.

14. The method of claim 13, further comprising redirecting a local display of the local computer over the network to the remote computer for display.

15. The method of claim 14, wherein prior to executing the playback agent application, the method further comprises converting the mouse coordinates to comply with a graphics resolution of the local display of the local computer.

16. The method of claim 14, wherein prior to redirecting the local display of the local computer, the method further comprises disabling a display of the local mouse cursor to result in an invisible mouse cursor operative over the local display while allowing the remote mouse cursor to be visible over a remote display of the local display redirected to the remote computer.

17. The method of claim 16, wherein the local computer comprises a server computer in a server farm and wherein prior to transmitting the non-keyboard related data within the keyboard protocol format through the keyboard connection of the server computer, the method further comprises transmitting the non-keyboard related data within the keyboard protocol format to a KVM switch designating the server computer to receive the non keyboard related data.

18. The method of claim 16, wherein the local computer comprises a server computer in a server farm and wherein the remote computer interacts with a server computer having a keyboard connection by using an internet protocol address of an interaction device connected to the server computer wherein the interaction device receives the non-keyboard related data from the remote computer and transmits the non-keyboard related data within the keyboard protocol format through the keyboard connection of the server computer.

19. A method for communicating non-keyboard related data to at least one server computer in a server farm via a keyboard connection wherein the at least one server computer in the server farm has a keyboard connection, comprising:
   receiving the non-keyboard related data at an interaction device for establishing interaction between a remote computer and the at least one server computer in the server farm;
   adding a keyboard protocol format to the non-keyboard related data;
   selecting the at least one server computer at a KVM switch interconnecting the interaction device with the server farm;
   transmitting the non-keyboard related data within the keyboard protocol format through the KVM switch and to the keyboard connection of the selected at least one server computer in the server farm;
   receiving and parsing the keyboard protocol format at the selected at least one server computer to retrieve the non-keyboard related data from the keyboard protocol format; and
   processing the non-keyboard related data.

20. The method of claim 19, wherein the non-keyboard related data comprises at least one of mouse coordinates of a remote mouse cursor and a mouse function command generated from a remote mouse connected to the remote computer and wherein the mouse function command comprises a non-standard keyboard sequence representing at least one of the following:
   right button down;
   right button up;
   left button down;
   left button up;
   scroll button forward;
   scroll button backward;
   scroll button up; and
   scroll button down;
   and wherein processing the non-keyboard related data comprises executing the mouse function command on the selected at least one server computer.

21. The method of claim 20, wherein receiving and parsing the keyboard protocol format comprises:
   at a keyboard filter driver residing on the selected at least one server computer:
      receiving and consuming the keyboard protocol format as non-standard keyboard sequences;
      receiving and interpreting the non-keyboard related data as the mouse coordinates; and
      providing the mouse coordinates to a playback agent application; and wherein processing the non-keyboard related data comprises:
         executing the playback agent application to utilize the mouse coordinates as the mouse coordinates of a local mouse cursor operative on the selected at least one server computer.

22. The method of claim 21, further comprising:
   disabling a display of the local mouse cursor to result in an invisible local mouse cursor operative on the selected at least one server computer while allowing a display of the remote mouse cursor over a remote display of the remote computer; and
   redirecting a display of the local computer over a network to the remote display.

23. The method of claim 19, wherein the keyboard connection comprises one of a PS/2 connection and an USB connection.

24. The method of claim 19, wherein the non-keyboard related data comprises a test command periodically generated and transmitted through the keyboard connection to the selected at least one server computer and wherein processing the test command comprises:
   in response to receiving the test command, generating a keyboard command;
   transmitting the keyboard command through the keyboard connection to indicate that the selected at least one server computer is operative;

receiving the keyboard command at the interaction device as a confirmation that the selected at least one server computer is operative; and transmitting the confirmation to the remote computer.

25. A method for communicating mouse coordinates of a remote mouse cursor via a keyboard connection of a local computer, wherein the remote mouse cursor is displayed over a remote display of a remote computer, the method comprising:

disabling a display of a local mouse cursor to result in an invisible mouse cursor operative over screen frames of a local display of the local computer while allowing the remote mouse cursor to be visible at the remote display over the screen frames of the local display that are redirected to the remote display;

retrieving the mouse coordinates at the remote computer;

sending the mouse coordinates to the local computer via the keyboard connection of the local computer;

receiving the mouse coordinates at the local computer;

setting a position of the invisible cursor to the mouse coordinates received at the local computer;

capturing the screen frames of the local display of the local computer; and redirecting the screen frames over a network to the remote display wherein the remote display comprises screen frames redirected over the network.

26. The method of claim 25, wherein sending the mouse coordinates to the local computer comprises:

transmitting the mouse coordinates over the network to an interaction device;

receiving the mouse coordinates at the interaction device;

adding a keyboard protocol format to the mouse coordinates; and transmitting the mouse coordinates within the keyboard protocol format through the keyboard connection of the local computer.

27. The method of claim 26, wherein receiving the mouse coordinates at the local computer comprises receiving and parsing the keyboard protocol format to retrieve the mouse coordinates from the keyboard protocol format.

28. A computer program product comprising a computer storage medium having control logic stored therein for causing an interaction device to communicate non-keyboard related data via a keyboard connection, said control logic comprising computer readable program code means for causing the interaction device to:

receive the non-keyboard related data;

add a keyboard protocol format to the non-keyboard related data; and transmit the non-keyboard related data within the keyboard protocol format through the keyboard connection;

cause a local computer in communication with the keyboard connection to receive and parse the keyboard protocol format to retrieve the non-keyboard related data from the keyboard protocol format; and to cause the local computer to process the non-keyboard related data.

29. The computer program product of claim 28, wherein the non-keyboard related data comprises at least one of mouse coordinates of a remote mouse cursor and a mouse function command each generated from a remote mouse connected to a remote computer and wherein the mouse function commands comprise a non-standard keyboard sequence representing at least one of the following:

right button down;
right button up;
left button down;
left button up;
scroll button forward;
scroll button backward;
scroll button up; and
scroll button down;

and wherein the keyboard protocol format comprises a start tag comprising a non-standard keyboard sequence indicating a start of the non-keyboard related data added to the beginning of at least one of the mouse coordinates and the mouse function commands and an end tag comprising a non-standard keyboard sequence indicating an end of the non-keyboard related data to the end of at least one of the mouse coordinates and the mouse function commands; and wherein the computer readable code means for causing the local computer to process the non-keyboard related data comprises computer readable code means for causing the local computer to at least one of execute the mouse function command on the local computer and utilize the mouse coordinates as mouse coordinates of a local mouse cursor of the local computer.

30. The computer program product of claim 29, wherein the computer readable code means for causing the local computer to receive and parse the keyboard protocol format comprises computer readable code means for causing the local computer to:

receive and consume the start tag as a non-standard keyboard sequence;

receive and interpret the non-keyboard related data as the mouse coordinates;

receive and consume the end tag as a non-standard keyboard sequence; and provide the mouse coordinates to the computer readable code means for causing the local computer to process the non-keyboard related data;

and wherein the computer readable code means for causing the local computer to process the non-keyboard related data comprises computer readable code means for causing the local computer to utilize the mouse coordinates as the mouse coordinates of the local mouse cursor of the local computer.

31. The computer program product of claim 30, wherein the non-keyboard related data comprises a non standard keyboard sequence representing a command to disable the display of a local mouse cursor of the local computer to result in an invisible local mouse cursor operative over a display screen of the local computer and wherein the computer program product further comprises computer readable code means for causing the interaction device to redirect the display screen of the local computer over a network to a display screen of a remote computer.

32. A system for communicating non-keyboard related data via at least one keyboard connection, the system comprising:

an interaction device operative to receive the non-keyboard related data, execute a keyboard protocol application to add a keyboard protocol format to the non-keyboard related data, and to transmit the non-keyboard related data within the keyboard protocol format through the keyboard connection; and at least one local computer in communication with a keyboard connection capable of receiving the non-keyboard related data within the keyboard protocol format, the at least one local computer operative to execute an operating system and a keyboard filter driver to receive and parse the keyboard protocol format to retrieve the non-keyboard related data from the keyboard protocol format, and to execute a playback agent to process the non-keyboard related data.

33. The system of claim 32, wherein the interaction device further includes:
   a local display screen operative to display output from the at least one local computer; and
   a network interface operative to redirect screen frames of the local display screen across a network; and
   wherein the interaction device is further operative to execute a web server application to establish an IP address and provide the screen frames of the local display screen to the network interface device and wherein the system further comprises:
      a remote computer including a remote mouse, a remote network interface, and a remote display screen wherein the remote computer is operative to:
         execute a web browser application to locate the IP address established by the web server application;
         execute a remote console application to retrieve and transmit the non-keyboard related data from the remote computer via the remote network interface;
         display a remote mouse cursor generated by the remote mouse over the remote display screen; and
         display on the remote display screen, the screen frames of the local display screen redirected across the network to the remote computer.

34. The system of claim 33, wherein the non-keyboard related data comprises mouse coordinates of the remote mouse cursor and wherein the playback agent provides the mouse coordinates to the operating system of the at least one local computer to set a position of a local mouse cursor on the local display screen to the provided mouse coordinates.

35. The system of claim 34, wherein prior to redirecting the screen frames of the local display screen across the network for display on the remote display screen, the at least one local computer is further operative to:
   receive a command from the remote computer to disable a display of the local mouse cursor wherein the command comprises a non-standard keyboard sequence communicated via the at least one keyboard connection;
   in response to receiving the command, disable a display of the local mouse cursor to result in the local mouse cursor becoming invisible on the local display screen while allowing the remote mouse cursor to be visible on the remote display screen over the redirected screen frames of the local display screen.

36. The system of claim 34, wherein the at least one local computer comprises at least one server computer in a server farm and wherein the system further comprises a KVM switch interconnecting the interaction device with the server farm and wherein prior to transmitting the non-keyboard related data through the keyboard connection, the interaction device is further operative to select at the KVM switch the at least one server computer to receive the non-keyboard related data via the at least one keyboard connection.

37. The system of claim 32, wherein the at least one keyboard connection comprises one of a PS/2 connection and an USB connection.

* * * * *